United States Patent
Choi (10) Patent No.: US 7,409,229 B2
(45) Date of Patent: Aug. 5, 2008

(54) MOBILE COMMUNICATION TERMINAL AND METHOD FOR INPUTTING CHARACTERS BY SPEECH RECOGNITION

(75) Inventor: Hye-Rym Choi, Yongin-shi (KR)

(73) Assignee: Samsung Electronics Co., Ltd (KR)

(*) Notice: Subject to any disclaimer, the term of this patent is extended or adjusted under 35 U.S.C. 154(b) by 578 days.

(21) Appl. No.: 10/821,525

(22) Filed: Apr. 9, 2004

(65) Prior Publication Data

US 2005/0009569 A1  Jan. 13, 2005

(30) Foreign Application Priority Data

Jul. 7, 2003 (KR) ............ 10-2003-0045643

(51) Int. Cl.
*H04B 1/38* (2006.01)
(52) U.S. Cl. .............. 455/563; 455/412.1; 455/414.1; 455/418; 704/201
(58) Field of Classification Search .......... 455/563, 455/466, 412.1, 550.1, 66.1, 569.1, 565, 455/564, 414.1, 468; 704/201, 270, 275
See application file for complete search history.

(56) References Cited

U.S. PATENT DOCUMENTS

| | | | | |
|---|---|---|---|---|
| 5,182,765 A * | 1/1993 | Ishii et al. | ............... | 379/88.04 |
| 5,956,681 A * | 9/1999 | Yamakita | .................. | 704/260 |
| 6,266,639 B1 * | 7/2001 | Goldberg et al. | ............ | 704/270 |
| 6,321,195 B1 * | 11/2001 | Lee et al. | .................... | 704/241 |
| 6,456,976 B1 * | 9/2002 | Kuita | ........................ | 704/273 |
| 6,498,834 B1 * | 12/2002 | Sera | ........................ | 379/88.02 |
| 6,529,747 B1 * | 3/2003 | Toba | .......................... | 455/563 |
| 6,577,881 B1 * | 6/2003 | Ehara | ......................... | 455/563 |
| 6,665,547 B1 * | 12/2003 | Ehara | ......................... | 455/563 |
| 6,931,263 B1 * | 8/2005 | Boucher et al. | ............. | 455/563 |
| 6,934,552 B2 * | 8/2005 | Holley et al. | ................ | 455/466 |
| 2001/0004589 A1 * | 6/2001 | Massy et al. | ................ | 455/414 |
| 2002/0046035 A1 * | 4/2002 | Kitahara et al. | ............ | 704/277 |
| 2003/0101054 A1 * | 5/2003 | Davis et al. | ................. | 704/235 |
| 2003/0130016 A1 * | 7/2003 | Matsuura et al. | ........... | 455/569 |
| 2005/0114137 A1 * | 5/2005 | Saito et al. | .................. | 704/260 |
| 2005/0203745 A1 * | 9/2005 | Stylianou et al. | ........... | 704/268 |
| 2005/0228645 A1 * | 10/2005 | Nishimura et al. | ......... | 704/201 |

FOREIGN PATENT DOCUMENTS

CN  1272198  11/2000

* cited by examiner

*Primary Examiner*—Tan Trinh
(74) *Attorney, Agent, or Firm*—The Farrell Law Firm, PC (57) ABSTRACT

Disclosed is a mobile communication terminal capable of speech recognition that includes a speech processing unit, a speech recognizing unit, a speech information managing database and a control unit, and method for utilizing same. A speech signal is modulated by the speech processing unit and converted into speech data for the speech recognizing unit to recognize and to output corresponding speech information. The speech information managing database includes a table storing character information corresponding to the speech information. The control unit recognizes speech through the speech recognizing unit upon a demand for character input by speech recognition in a character input mode, detects character information corresponding to the recognized speech information, recognizes whether detected corresponding character information is input and displays via a display unit the input character information.

24 Claims, 6 Drawing Sheets

| SPEECH INFORMATION | WEBSITE ADDRESSES |
|---|---|
| YAHOO | www.yahoo.co.kr |
| SAMSUNG ELECTRONICS | www.samsung.co.kr |
| ⋮ | ⋮ |

(b)

| SPEECH INFORMATION | BANK ACCOUNT NOS. |
|---|---|
| HANA BANK | 654321-87-012345 |
| KOOKMIN BANK | xxx-xxx-xxx |
| ⋮ | ⋮ |

(c)

| SPEECH INFORMATION | TELEPHONE NOS. |
|---|---|
| MY HOME | 02-123-4567 |
| CHOI HYE RIM | 016-234-5678 |
| ⋮ | ⋮ |

| SPEECH INFORMATION | ITEM | DETAIL |
|---|---|---|
| HONG GIL DONG | TELEPHONE | 02-123-4567 |
| | E-MAIL | hong@samsung.com |
| | HOMEPAGE | www.hong.co.kr |

MOBILE COMMUNICATION TERMINAL AND METHOD FOR INPUTTING CHARACTERS BY SPEECH RECOGNITION

PRIORITY

This application claims priority to an application entitled "Mobile Communication Terminal and Method for Inputting Characters by Speech Recognition" filed in the Korean Intellectual Property Office on Jul. 7, 2003 and assigned Ser. No. 2003-45643, the contents of which are hereby incorporated by reference.

BACKGROUND OF THE INVENTION

1. Field of the Invention

The present invention relates to a mobile communication terminal, and more particularly to a mobile communication terminal and a method for inputting characters using a speech recognition function.

2. Description of the Related Art

Generally, a mobile communication terminal is provided with a plurality of keys for inputting numbers and English, Korean or other characters. A user can input characters in the mobile terminal by pressing the plurality of keys and thereby handle various functions, such as a short message service (SMS), memo, wireless Internet access and call initiation. For example, the user can use SMS in the mobile communication terminal by inputting a message, together with telephone numbers of the sender and the recipient, using the plurality of keys. The user can input a memo message using the keys. Also, the user can use a wireless Internet service to access a website by pressing the keys.

However, it is troublesome and inconvenient for the user to directly input characters using the plurality of keys in order to use various services, such as SMS, memo and wireless Internet access.

SUMMARY OF THE INVENTION

Accordingly, the present invention has been made to solve the above-mentioned problems occurring in the prior art, and one object of the present invention is to provide a mobile communication terminal and a method for easily inputting characters by speech recognition, which eliminates the need to directly press a plurality of keys. The term "characters" used herein is defined to include both numbers and letters.

Another object of the present invention is to provide a mobile communication terminal and a method for recognizing speech and inputting and sending a message corresponding to the recognized speech.

Still another object of the present invention is to provide a mobile communication terminal and a method for recognizing speech and inputting a telephone number of the recipient corresponding to the recognized speech.

Still another object of the present invention is to provide a mobile communication terminal and a method for recognizing speech and inputting a website address corresponding to the recognized speech when using a wireless Internet service, or inputting a bank account number corresponding to the recognized speech when using a phone banking service.

In order to accomplish the above objects, a mobile communication terminal is provided capable of speech recognition, which comprises: a speech processing unit for modulating a speech signal inputted from outside and converting the speech signal into speech data; a speech recognizing unit for recognizing speech based on the speech data and outputting corresponding speech information; a speech information managing database including a table storing character information corresponding to the speech information; a control unit for recognizing speech through the speech recognizing unit upon input of a speech signal in accordance with a demand for character input by speech recognition in a character input mode, detecting character information corresponding to the speech information recognized by the speech information managing database, and recognizing that the corresponding character information, if detected, has been inputted; and a display unit for displaying the state in which the character information is inputted, under the control of the control unit.

In accordance with another aspect of the present invention, a method is provided for inputting characters in a mobile communication terminal capable of speech recognition, said method comprising the steps of: determining whether a demand for character input by speech recognition is inputted by a user in a character input mode; when there is a demand for character input by speech recognition, determining whether a speech signal is inputted from outside; when a speech signal is inputted from outside, recognizing the inputted speech and detecting character information corresponding to the recognized speech information in a table that stores character information corresponding to each speech information; and when corresponding character information is detected, recognizing that the character information has been inputted and displaying the state in which the character information is inputted on a display unit.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the drawings, the same element, although depicted in different drawings, will be designated by the same reference numeral or character. Although certain elements, such as a circuit device, are specifically defined in the following description of the present invention, it will be obvious to those skilled in the art that such definitions of elements are merely to improve understanding of the present invention and that the present invention can be carried out without such specific elements. Also, in the following description of the present invention, a detailed description of known functions and configurations is omitted to avoid making the subject matter of the present invention unclear.

Figure 1:
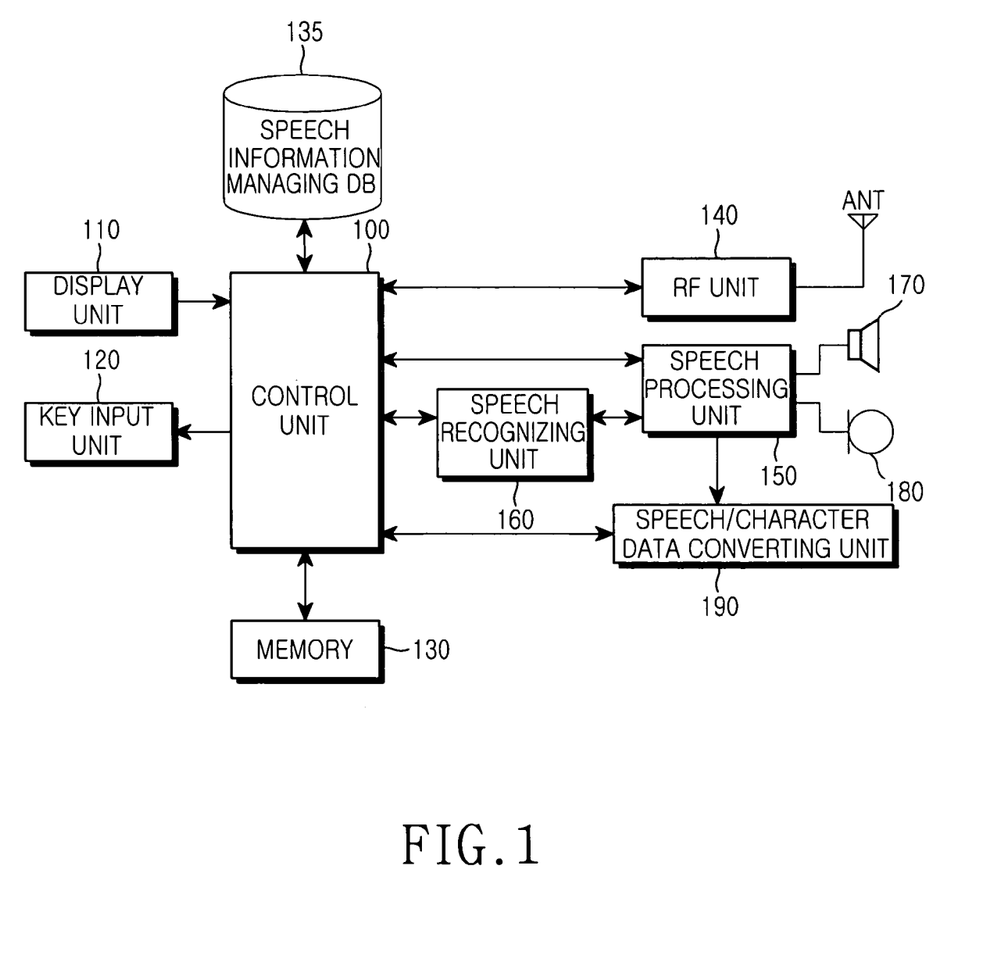
FIG. 1 is a block diagram of a mobile communication terminal according to the present invention.

FIG. 1 is a block diagram of a mobile communication terminal according to the present invention. The mobile communication terminal comprises a control unit 100, a display unit 110, a key input unit 120, a memory 130, an RF unit 140, a speech processing unit 150, a speech recognizing unit 160, a speaker 170, a microphone 180, a speech/character data converting unit 190 and a speech information managing database (DB) 135.

The control unit 100 controls the overall operation of the mobile communication terminal. Particularly, the control unit 100 controls the operation of the mobile communication terminal to implement a character input function by speech recognition according to the present invention. To be specific, when there is a demand for character input in a character input mode, the control unit 100 recognizes a speech signal inputted by the user. Subsequently, the control unit 100 recognizes that a message or character information corresponding to the recognized speech has been inputted, and displays the inputted message or character information.

The memory 130 may comprise a ROM for storing an operation program and an electrically programmable EEPROM and a RAM. The memory 130 stores a program for implementing a function of character input by speech recognition according to the present invention. Also, the memory 130 stores a conversion table for converting speech data into character data.

The display unit 110 may comprise a display device, such as a liquid crystal display (LCD). Under the control of the control unit 100, the display unit 110 displays the state of the mobile communication terminal, program running state, character information or message inputted by speech recognition or the like.

The key input unit 120 is provided with a plurality of character keys, function keys for implementing various functions and a speech recognition key. When the speech recognition key is pressed, key input data corresponding to a demand for character input by speech recognition is outputted to the control unit 100.

The RF unit 140 sends various data to a base station through an antenna under the control of the control unit 100. Also, the RF unit 140 transfers data received from the base station to the control unit 100.

The speech processing unit 150 converts speech data received by the RF unit 140 into an audible sound and outputs it through the speaker 170 under the control of the control unit 100. The speech processing unit 150 also modulates a speech signal received from the microphone 180, converts the signal into speech data and outputs the data.

The speech/character data converting unit 190 converts the speech data outputted from the speech processing unit 150 into character data based on the conversion table stored in the memory 130, and outputs the character data under the control of the control unit 100.

The speech recognizing unit 160 detects a speech characteristic of the speech data outputted from the speech processing unit 150 to recognize the speech. Also, the speech recognizing unit 160 transfers speech information corresponding to the recognized speech to the control unit 100.

According to the first embodiment of the present invention, the speech information managing DB 135 includes a table that stores character information corresponding to speech information or data. According to the second embodiment of the present invention, the speech information managing DB 135 includes a table that stores several items corresponding to speech information.

In a mobile communication terminal according to the first embodiment, it is possible to input characters in the character input mode by speech, relying on a table storing character information corresponding to each speech information. The character input mode is a mode for inputting characters, such as a text message, a website address or a bank account number, in order to use services, such as short message service (SMS), multimedia messaging service (MMS), wireless Internet access or phone banking service.

Figure 2:
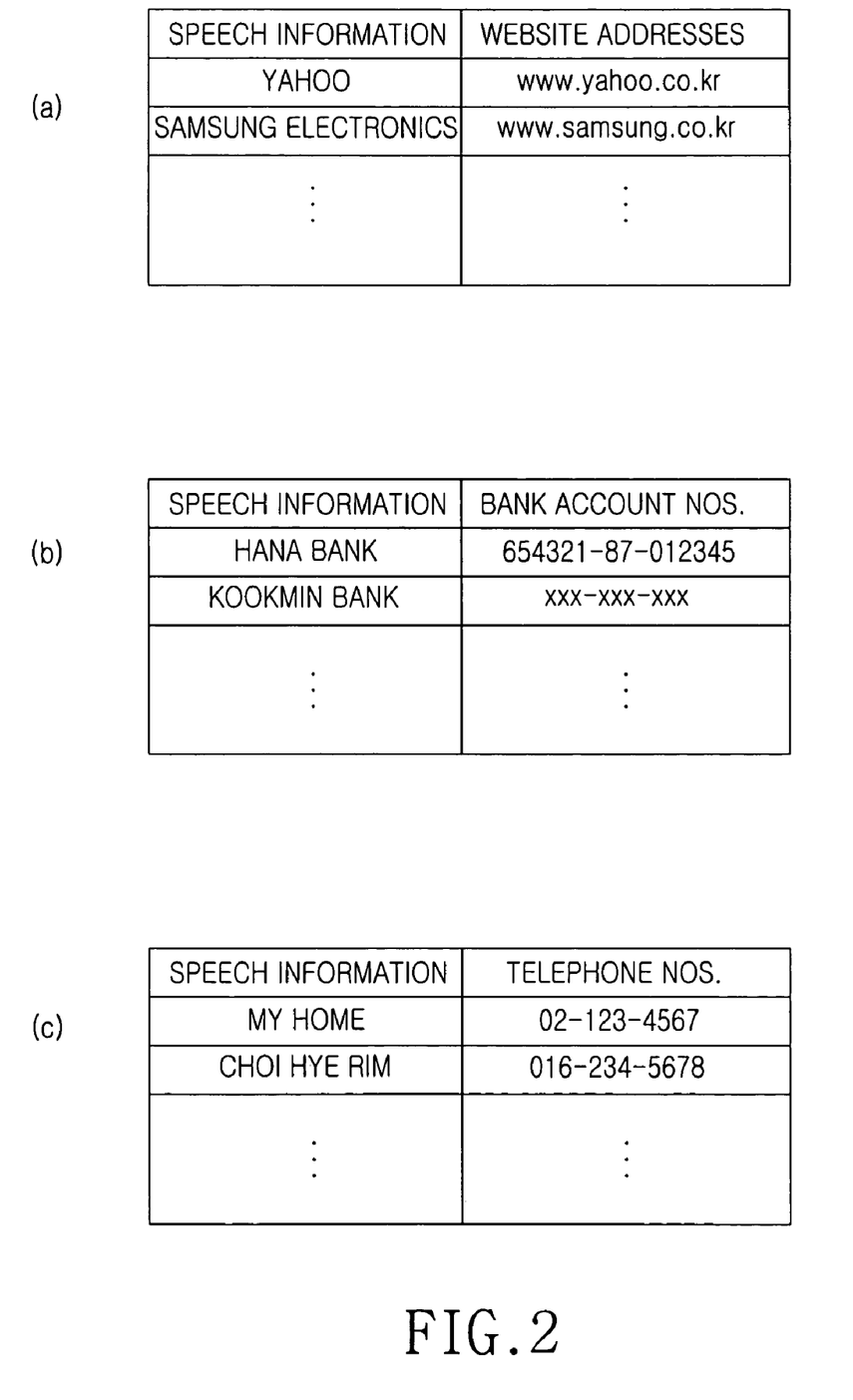
FIG. 2 shows a table storing character information corresponding to speech information according to a first embodiment of the present invention.

FIG. 2 shows a table that stores character information corresponding to speech information according to the first embodiment of the present invention. FIG. 2(*a*) shows a table storing website addresses corresponding to speech information. FIG. 2(*b*) shows a table storing bank account numbers corresponding to speech information. FIG. 2(*c*) shows a table storing telephone numbers corresponding to speech information.

Figure 3:
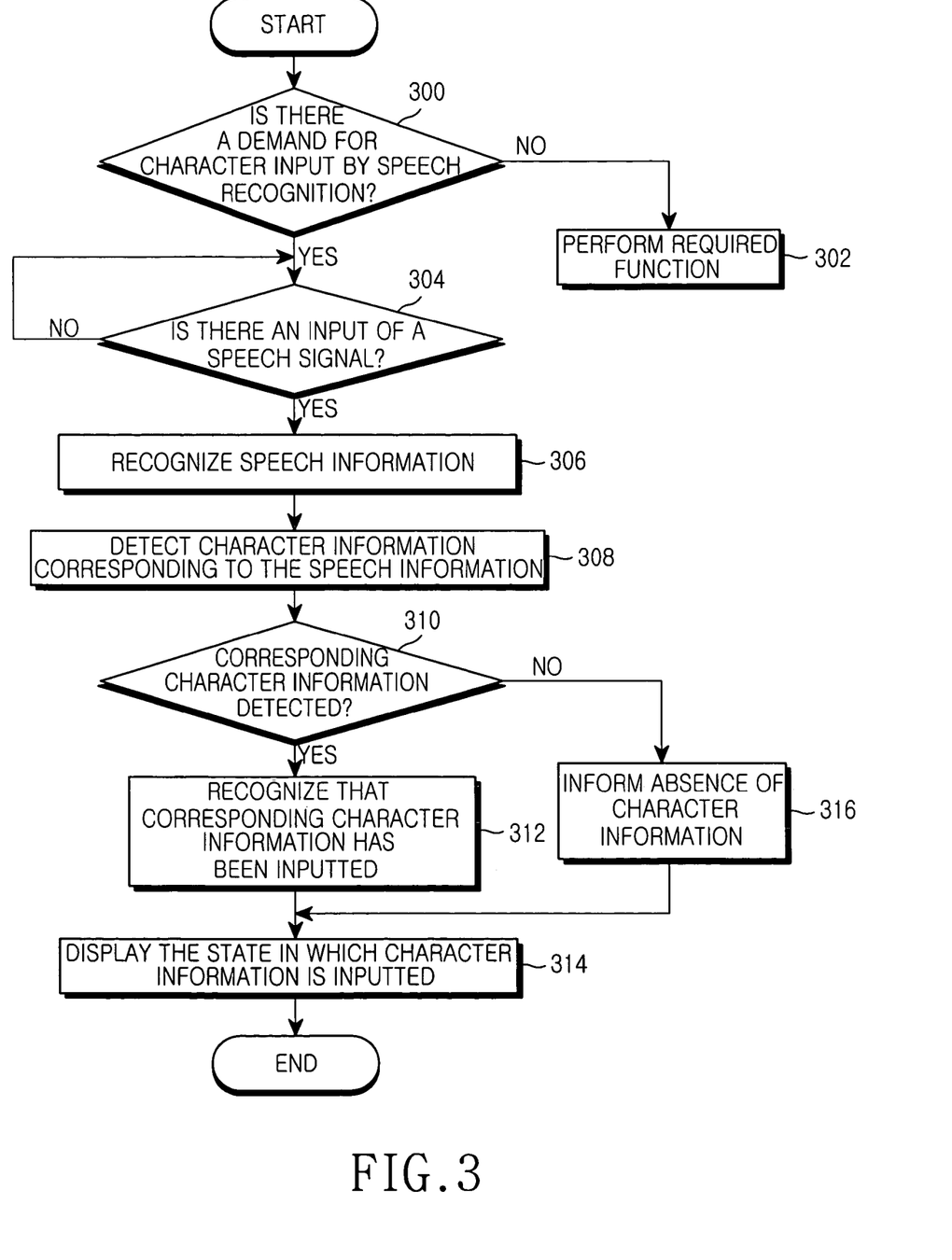
FIG. 3 is a flowchart of a process of inputting characters by speech recognition according to the first embodiment of the present invention.

FIG. 3 is a flowchart of a process of inputting characters in a mobile communication terminal by speech recognition according to the first embodiment of the present invention. Hereinafter, the process of inputting characters according to the first embodiment will be explained in more detail with reference to FIGS. 1 to 3.

At step 300, the control unit 100 determines whether there is a demand for inputting characters corresponding to a text message, a website address, an account number or the like to use SMS, MMS, wireless Internet service or phone banking service. The user can input a demand for character input by pressing the speech recognition key.

If it is determined that there is no demand for character input, the control unit 100 will proceed with step 302 to perform a required function. If there is a demand for character input, the control unit 100 will proceed with step 304.

At step 304, the control unit 100 determines whether a speech signal is input. When a speech signal is input to the speech processing unit 150 through the microphone 180, the control unit 100 proceeds with step 306. At step 306, the control unit 100 controls the speech processing unit 150 to modulate and convert the input speech signal into speech data and output the speech data. The control unit 100 then controls the speech recognizing unit 160 to detect a speech characteristic of the speech data output from the speech processing unit 150 and recognize speech information.

At step 308, the control unit 100 detects character information corresponding to the recognized speech information. For example, the control unit 100 can search for the character information in tables stored in the speech information managing DB 135 as shown in FIG. 2. After detecting a table storing character information corresponding to the recognized speech information in the speech information managing DB 135, the control unit 100 proceeds with step 310 to determine whether the character information corresponding to the recognized speech is included in the table.

When the character information corresponding to the recognized speech information is present, the control unit 100 recognizes that the character information has been inputted (step 312). For example, if speech information is "Samsung Electronics", as shown in FIG. 2(*a*), the control unit 100 will recognize that a website address "www.samsung.co.kr" corresponding to the word "Samsung Electronics" has been input. If speech information is "Hana Bank", as shown in FIG. 2(*b*), the control unit 100 will recognize that an account number "654321-87-012345" corresponding to the word "Hana Bank" has been input. If speech information is "my home", as shown in FIG. 2(c), the control unit 100 will recognize that a telephone number "02-123-4567" of my home has been input.

After recognizing that the character information corresponding to the recognized speech information has been input, the control unit 100 proceeds with step 314 to display the state in which the character information is input on the display unit 110.

If no character information corresponding to the recognized speech information is detected, the control unit 100 will proceed with step 316 and will inform the user that no corresponding character information is present. At this time, the control unit 100 may provide an alarm to inform the absence of the character information or lead the user to input the character information directly by pressing the keys.

According to the second embodiment, when a demand for character input by speech recognition is inputted by the user to forward a SMS or MMS message, a mobile communication terminal displays items corresponding to inputted speech. Subsequently, when the user inputs speech or a key corresponding to an item to be selected, the mobile communication terminal recognizes that the item selected by speech or key input has been inputted as a message.

Figure 4:
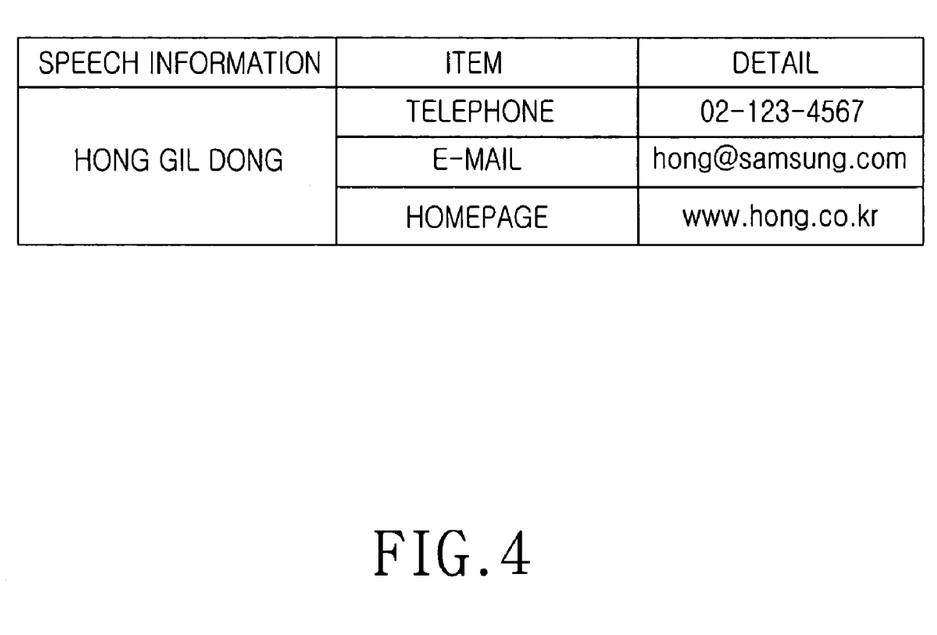
FIG. 4 shows a table storing several items corresponding to speech information according a second embodiment of the present invention.

FIG. 4 shows a table storing items corresponding to speech information according to the second embodiment of the present invention. In accordance with the second embodiment, the speech information managing DB 135 includes a table for storing items, such as a telephone number, an e-mail address and a homepage address, corresponding to speech information of "Hong Gil Dong", as shown in FIG. 4.

Figure 5:
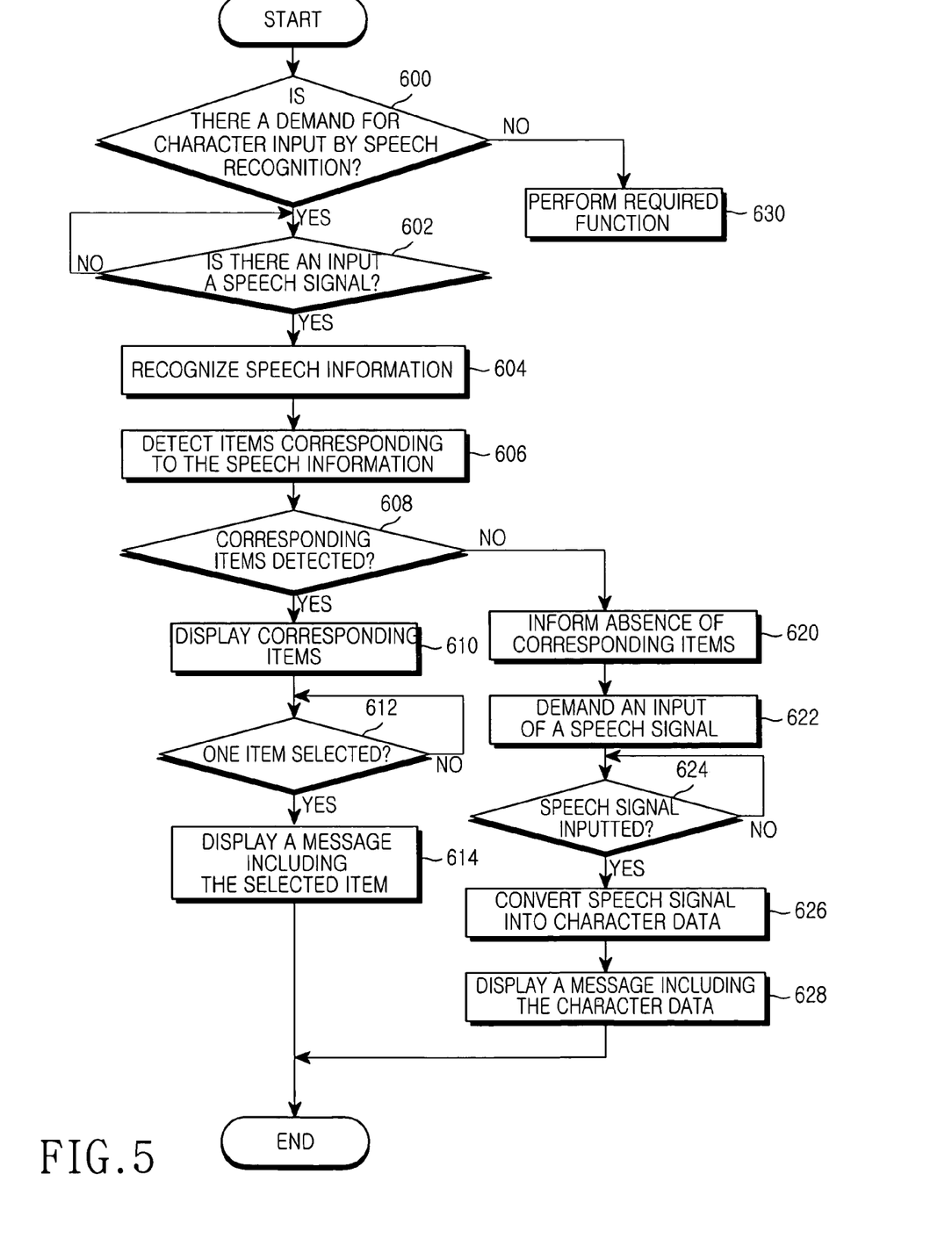
FIG. 5 is a flowchart of a process of inputting a message by speech recognition according to the second embodiment of the present invention.
Figure 6:
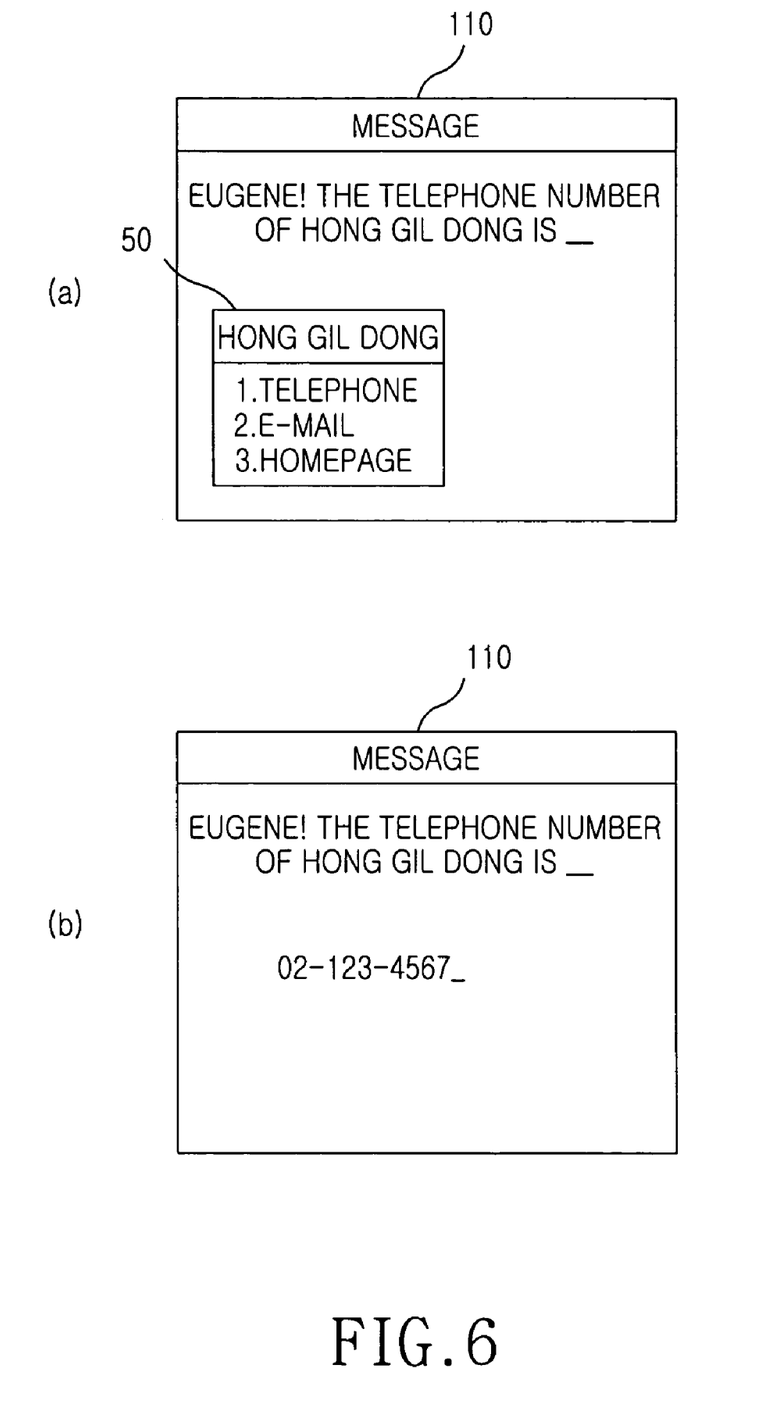
FIG. 6 shows an example of a picture displayed on a display unit when a message is inputted by speech recognition according to the second embodiment of the present invention.

FIG. 5 is a flowchart of a process of inputting characters by speech recognition according to the second embodiment of the present invention. FIG. 6 shows an example of a picture displayed on the display unit 110 when a message is inputted by speech recognition according to the second embodiment of the present invention.

The process of inputting a message by speech recognition according to the second embodiment will be described in more detail with reference to FIGS. 1 and 4 to 6.

Referring to FIG. 5, at step 600, the control unit 100 determines whether the user has inputted a demand for character input by speech recognition during preparation of a SMS or MMS message in a message preparing mode. While inputting characters for a SMS or MMS message in the message preparing mode, the user can press the speech recognition key as a demand for character input by speech recognition.

If there is no demand for character input from the user, the control unit 100 will proceed with step 630 to perform a required function. If the user inputs the speech recognition key as a demand for character input, the control unit 100 will proceed with step 602. At step 602, the control unit 100 determine whether a speech signal is inputted. When a speech signal is inputted to the speech processing unit 150 through the microphone 180, the control unit 100 proceeds with step 604. At step 604, the control unit 100 controls the speech processing unit 150 to modulate the inputted speech signal and convert it into speech data. When the speech processing unit 150 outputs the speech data, the control unit 100 controls the speech recognizing unit 160 to detect a speech characteristic of the speech data outputted from the speech processing unit 150 and recognizes corresponding speech information.

Upon recognizing the speech information, the control unit 100 searches for items corresponding to the recognized speech information at step 606. For example, the control unit 100 searches for a table storing items corresponding to the recognized speech information as shown in FIG. 4. Subsequently, at step 608, the control unit 100 determines whether items corresponding to the recognized speech are detected.

When items corresponding to the recognized speech information are detected, the control unit 100 displays the items at step 610. As shown in FIG. 6(a), the control unit may display the items in a pop-up menu window 50 on the display unit 110. For example, if the recognized speech information is "Hong Gil Dong", items corresponding to the speech information, such as a telephone number, an e-mail address and a homepage address of Hong Gil Dong will be displayed in the pop-up menu window 50, as shown in FIG. 6(a).

After displaying the items corresponding to the recognized speech information, the control unit 100 selects one of the displayed items at step 612 when there is a key or speech input for selecting the item, and proceeds with step 614. For example, if a key or speech is input to select the item "telephone" from among the items displayed in the pop-up menu window 50, the control unit 100 will select the telephone number for Hong Gil Dong and will proceed with step 614.

At step 614, the control unit 100 recognizes that detailed information for the selected item has been input, and displays a text message including the selected information on the display unit 110. For example, if the item "telephone" is selected, the control unit 100 will recognize that the telephone number 02-123-4567 has been inputted and will display a message including the telephone number 02-123-4567 on the display unit 110, as shown in FIG. 6(b).

If no items corresponding to the recognized speech information are detected at step 608, the control unit 100 will inform the absence of corresponding items at step 620 and will proceed with step 622 to request an input of a speech signal which will be inputted as a message. At step 622, the control unit 100 may display a message requesting an input of a speech signal on the display unit 110.

Subsequently, at step 624, the control unit 100 determines whether there is an input of a speech signal. If a speech signal has been inputted, the control unit 100 will proceed with step 626. At step 626, the control unit 100 controls the speech processing unit 150 to modulate and convert the speech signal into speech data and output the data. Also, the control unit 100 controls the speech/character data converting unit 190 to convert the speech data into corresponding character data. At next step 628, the control unit recognizes that the converted character data has been inputted as part of a text message, and displays the text message including the character data.

As described above, when there is a demand for character input by speech recognition, a mobile communication terminal according to the present invention determines whether a speech signal has been inputted. When there is an input of a speech signal, the mobile communication terminal detects character data corresponding to the inputted speech, and recognizes that the character data has been inputted. Also, when a user inputs a demand for inputting characters by speech recognition during preparation of a SMS or MMS message, the mobile communication terminal displays items corresponding to the inputted speech. When there is a key or speech input for selecting one of the displayed items, the mobile communication terminal recognizes that the selected item has been inputted as a message.

The user can forward SMS or MMS messages, access an wireless Internet service or use a phone banking service through the mobile communication terminal capable of speech recognition, without the need to directly input characters, such as a text message, a website address or a bank account number.

While the invention has been shown and described with reference to certain preferred embodiments thereof, it will be understood by those skilled in the art that various changes in form and details may be made therein without departing from the spirit and scope of the invention, as defined by the appended claims.

What is claimed is:

1. A mobile communication terminal capable of speech recognition comprising:
   a speech processing unit for modulating a speech signal and converting the speech signal into speech data;
   a speech recognizing unit for recognizing speech based on the speech data and outputting corresponding speech information;
   a speech information managing database including a table for storing predetermined items corresponding to the speech information;
   a control unit for recognizing speech through the speech recognizing unit upon input of the speech signal in accordance with a demand for character input by speech recognition in a character input mode, converting the speech data into character information based on a conversion table stored in a memory, detecting items corresponding to the recognized speech information stored in the speech information managing database, when one of the detected items is selected, recognizing that detailed information for the selected item has been input as character information; and
   a display unit for displaying the corresponding items if detected and a message including the detailed information, under the control of the control unit.

2. The mobile communication terminal according to claim 1, wherein said character information relates to website addresses.

3. The mobile communication terminal according to claim 1, wherein said character information relates to bank account numbers.

4. The mobile communication terminal according to claim 1, wherein said character information relates to telephone numbers.

5. The mobile communication terminal according to claim 1, further comprising a speech recognition key for a user to input the demand for character input.

6. A method for inputting characters in a mobile communication terminal capable of speech recognition, said method comprising the steps of:
   determining whether a speech signal is inputted when in a character input mode, wherein the speech signal is converted into speech data;
   when the speech signal is inputted, recognizing the speech data and outputting corresponding speech information, wherein the speech data is converted into character information based on a conversion table stored in a memory;
   detecting items corresponding to the recognized speech information in a table that stores predetermined items corresponding to speech information; and
   displaying the corresponding items if detected, when one of the displayed items is selected, recognizing that detailed information for the selected item has been input as character information and displaying a message including the detailed information on a display unit.

7. The method according to claim 6, wherein said character information relates to website addresses.

8. The method according to claim 6, wherein said character information relates to bank account numbers.

9. The method according to claim 6, wherein said character information relates to telephone numbers.

10. A method for inputting characters in a mobile communication terminal capable of speech recognition, said method comprising the steps of:
    determining whether a demand for character input by speech recognition is inputted by a user in a character input mode;
    when there is a demand for character input by speech recognition, determining whether a speech signal is inputted, wherein the speech signal is converted into speech data, and wherein the speech data is converted into character information based on a conversion table stored in a memory;
    when the speech signal is inputted, recognizing the speech data and outputting corresponding speech information;
    detecting items corresponding to the recognized speech information in a table that stores items corresponding to speech information; and
    displaying the corresponding items if detected, when one of the displayed items is selected, recognizing that detailed information for the selected item has been input as character information and displaying a message including the detailed information on a display unit.

11. The method according to claim 10, wherein said character information relates to website addresses.

12. The method according to claim 10, wherein said character information relates to bank account numbers.

13. The method according to claim 10, wherein said character information relates to telephone numbers.

14. The method according to claim 10, wherein the user can input the demand for character input by pressing a speech recognition key.

15. A mobile communication terminal capable of speech recognition comprising:
    a speech processing unit for modulating a speech signal and converting the speech signal into speech data;
    a speech/character data convening unit for converting the speech data into character data based on a conversion table stored in a memory;
    a speech recognizing unit for recognizing speech based on the speech data and outputting corresponding speech information;
    a speech information managing database including a table for storing predetermined items corresponding to the speech information;
    a control unit for recognizing speech through the speech recognizing unit upon input of the speech signal in accordance with a demand for character input by speech recognition in a message preparing mode, detecting items corresponding to the recognized speech information stored in the speech information managing database, displaying corresponding items if detected, recognizing that detailed information of an item is selected from the displayed items, displaying a message including the selected detailed information; and, if no items corresponding to the recognized speech information are detected, recognizing that the inputted speech signal has been inputted as part of the message, converting the speech signal into character data and displaying the message including the character data.

16. The mobile communication terminal according to claim 15, wherein the stored items relate to website addresses.

17. The mobile communication terminal according to claim 15, wherein the stored items relate to bank account numbers.

18. The mobile communication terminal according to claim 15, wherein the stored items relate to telephone numbers.

19. A method for inputting characters in a mobile communication terminal, which is capable of speech recognition, and which comprises a speech information managing database including a table for storing predetermined items corresponding to speech information, the method comprising:

a first step of recognizing speech from an inputted speech signal, when a demand for character input by speech recognition is inputted by a user in a message preparing mode;

a second step of determining whether items corresponding to the recognized speech information are detected;

a third step of displaying the corresponding items, if detected; and a fourth step of, when one of the displayed items is selected, recognizing that detailed information for the selected item has been inputted and displaying a message including the selected detailed information.

20. The method according to claim 19, further comprising a fifth step of, when no items corresponding to the recognized speech information are detected, recognizing that the inputted speech signal has been inputted as part of the message, converting the speech signal into character data and displaying the message including the character information.

21. The method according to claim 19, wherein said third step displays items corresponding to the recognized speech information, if detected, in a pop-up menu window.

22. The method according to claim 19, wherein the selected items relate to website addresses.

23. The method according to claim 19, wherein the selected items relate to bank account numbers.

24. The method according to claim 19, wherein the selected items relate to telephone numbers.

* * * * *